Figure 9:
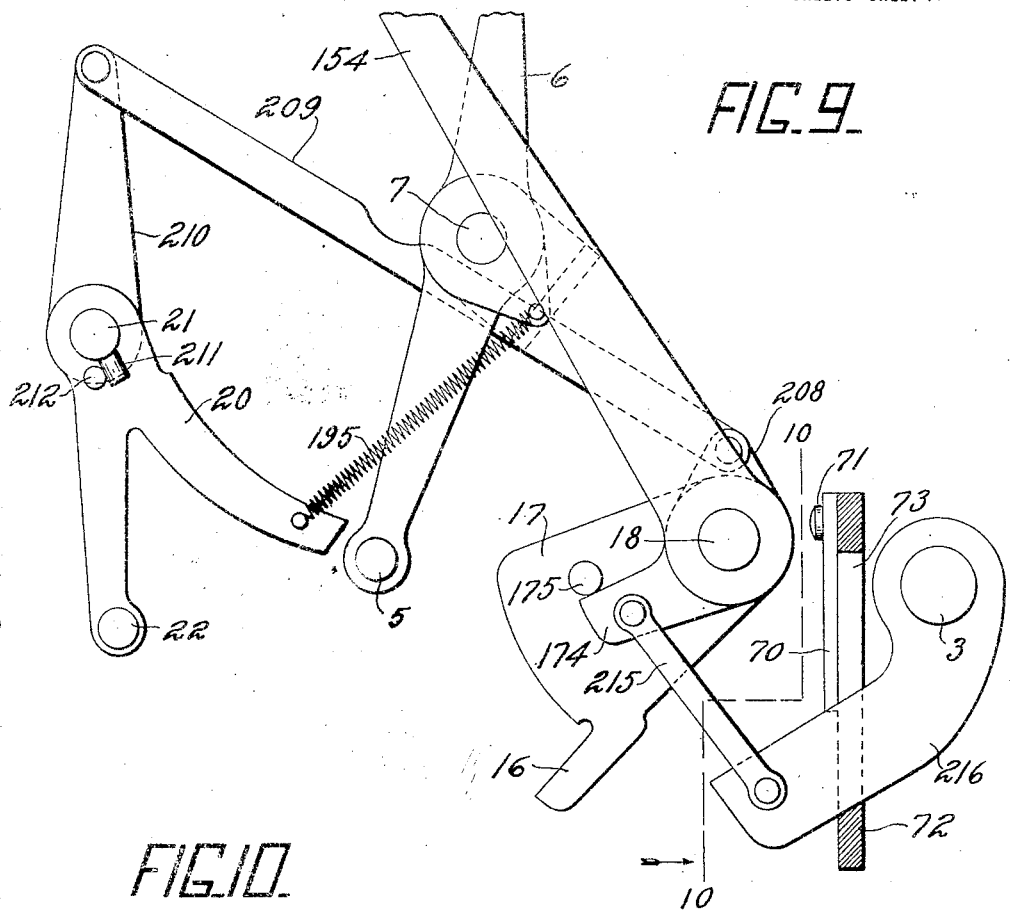

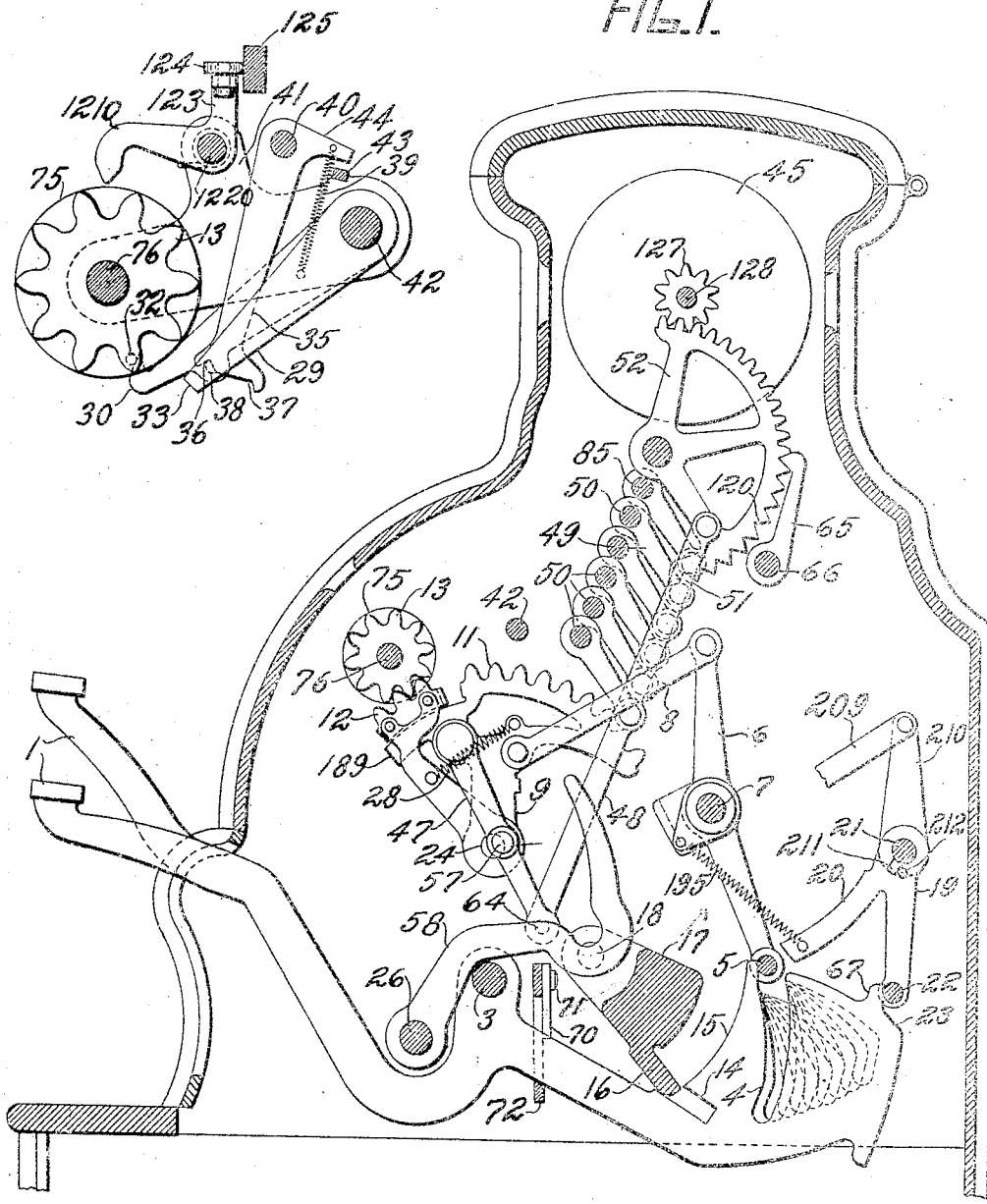

W. A. CHRYST.
MULTIPLE CASH REGISTER.
APPLICATION FILED DEC. 12, 1910.

1,161,026.

Patented Nov. 23, 1915.
9 SHEETS—SHEET 2.

FIG. 3

Witnesses
P. W. Fairchild
H. F. Sadgebury

Inventor
William A. Chryst
Attorneys

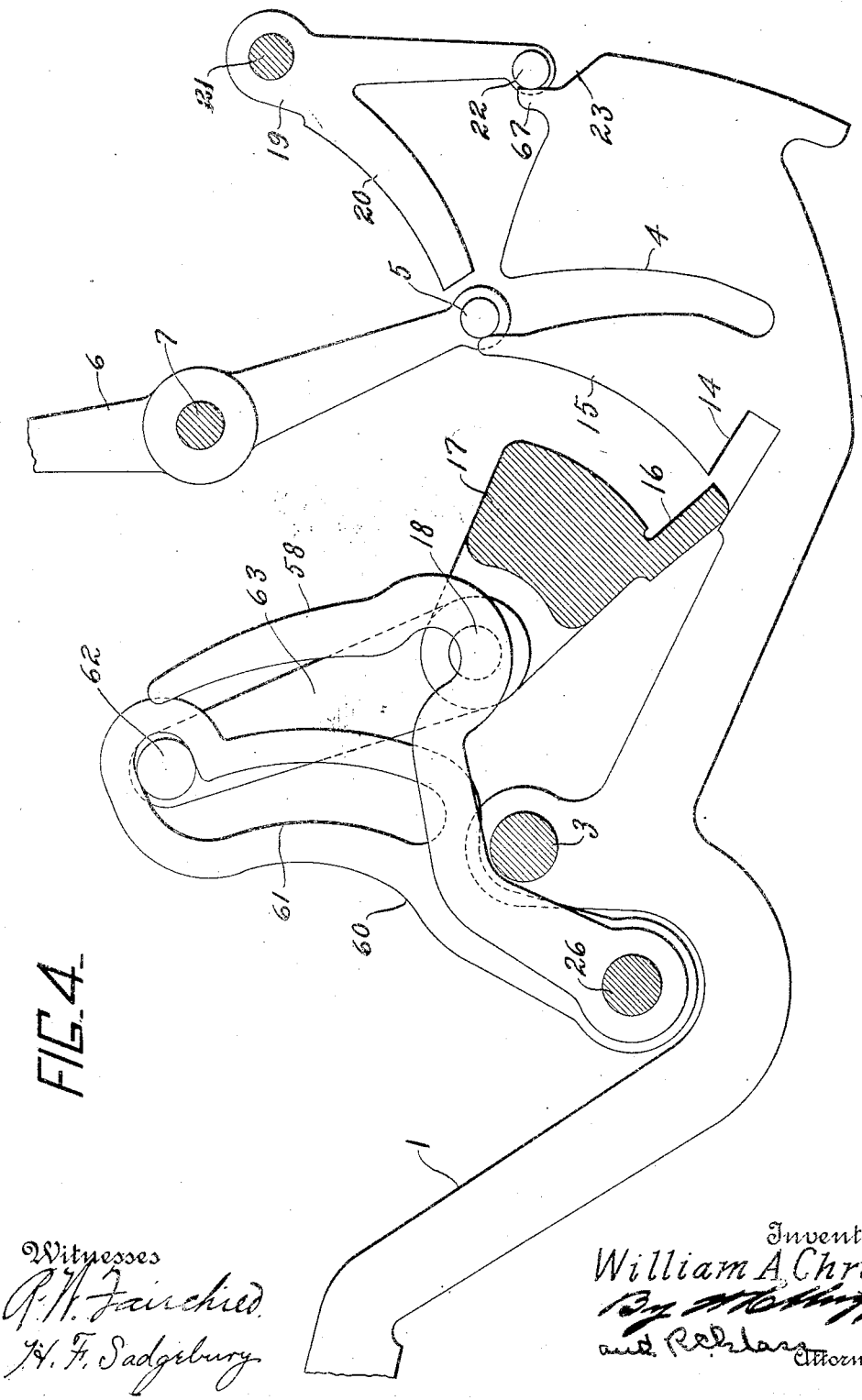

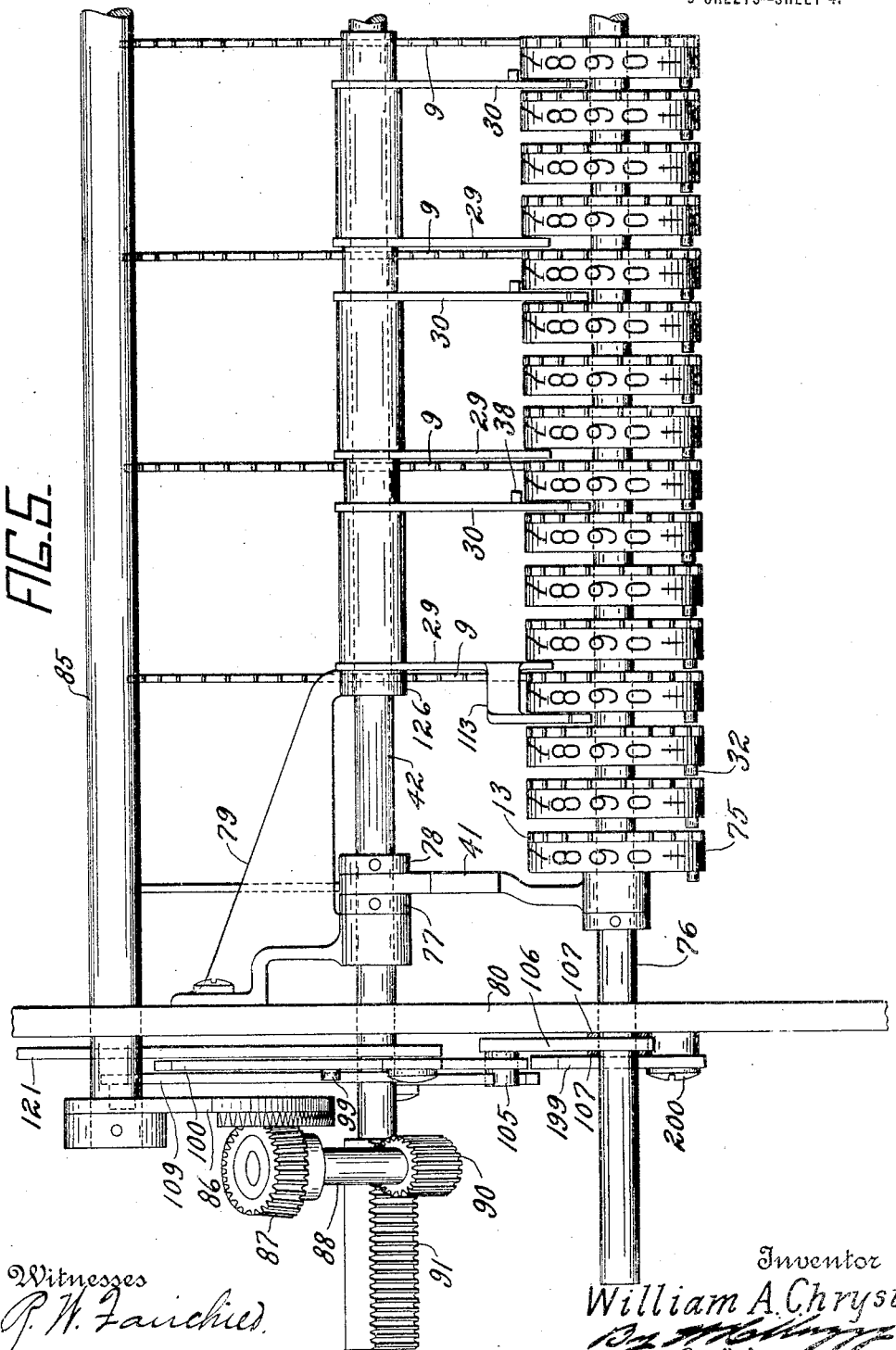

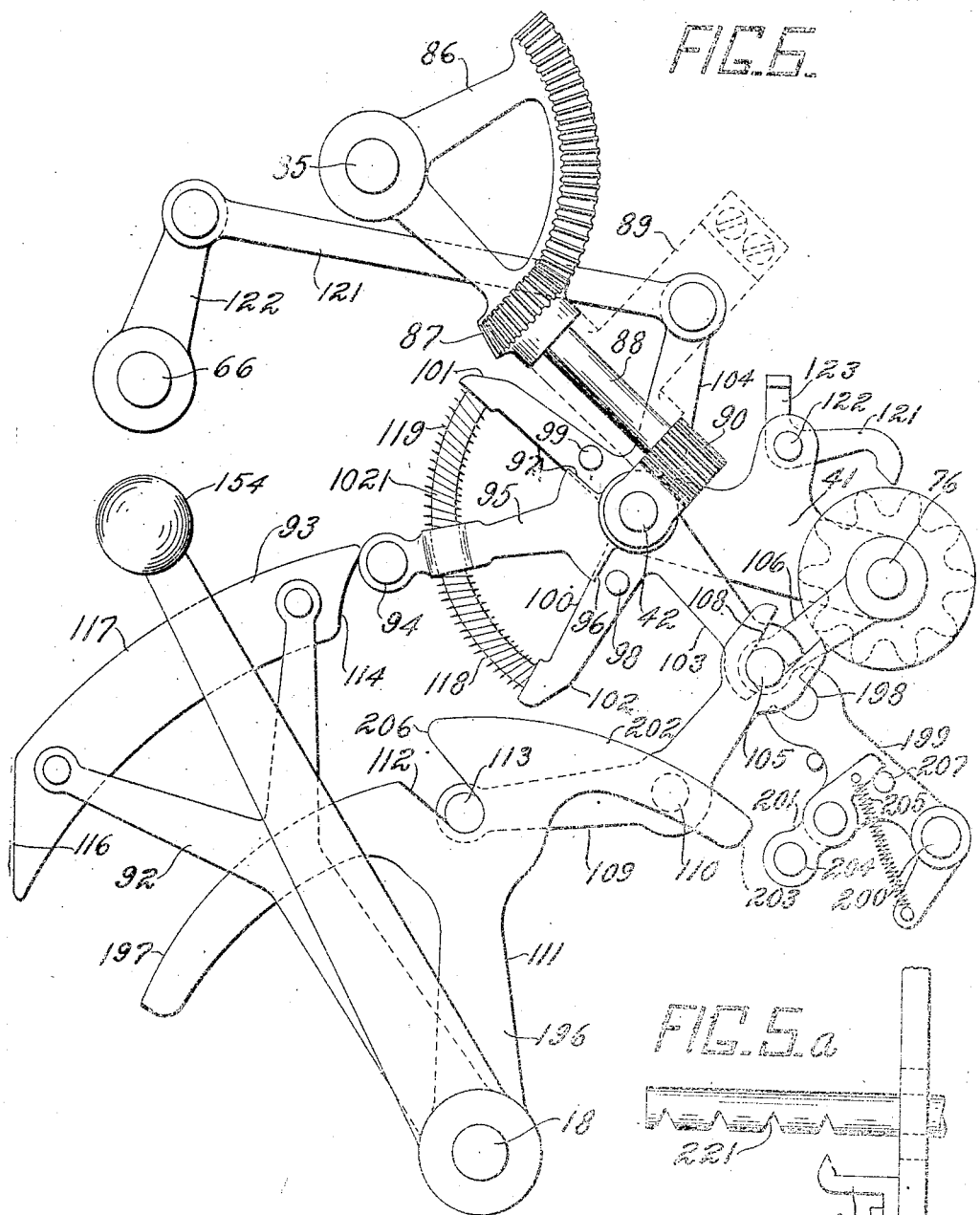

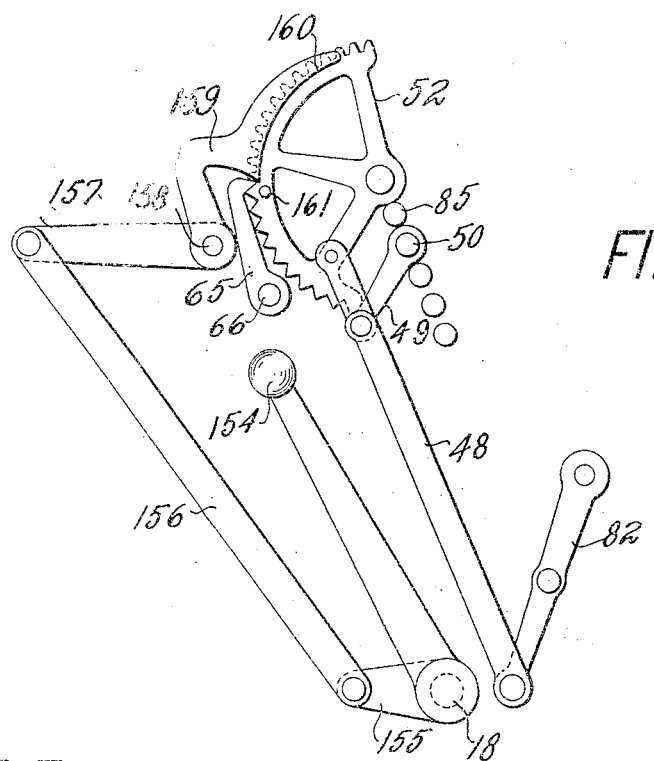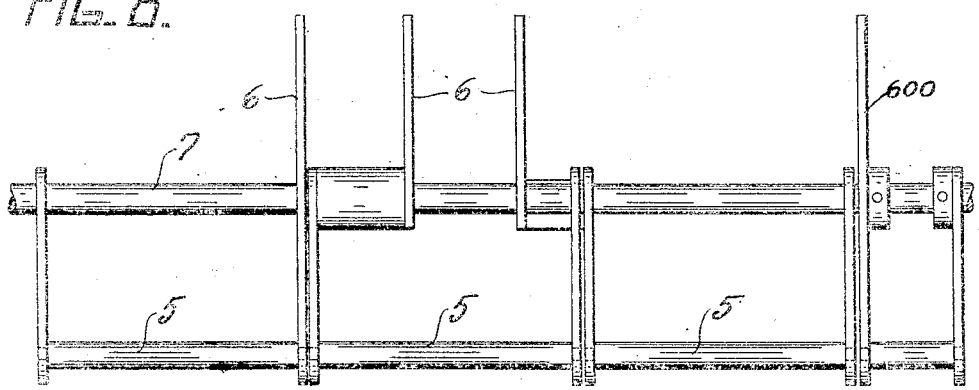

W. A. CHRYST.
MULTIPLE CASH REGISTER.
APPLICATION FILED DEC. 12, 1910.

1,161,026.

Patented Nov. 23, 1915.
9 SHEETS—SHEET 7.

Witnesses
R. W. Fairchild
H. F. Sadgebury

Inventor
William A. Chryst
By [signature]
and [signature] Attorneys

W. A. CHRYST.
MULTIPLE CASH REGISTER.
APPLICATION FILED DEC. 12, 1910.

1,161,026.

Patented Nov. 23, 1915.
9 SHEETS—SHEET 8.

W. A. CHRYST.
MULTIPLE CASH REGISTER.
APPLICATION FILED DEC. 12, 1910.

1,161,026.

Patented Nov. 23, 1915.
9 SHEETS—SHEET 9.

Witnesses
P. W. Fairchild
H. F. Sadgebury

Inventor
William A. Chryst
Attorneys

UNITED STATES PATENT OFFICE.

WILLIAM A. CHRYST, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MULTIPLE CASH-REGISTER.

1,161,026.

Specification of Letters Patent.

Patented Nov. 23, 1915.

Application filed December 12, 1910. Serial No. 596,830.

*To all whom it may concern:*

Be it known that I, WILLIAM A. CHRYST, a citizen of the United States, residing at Dayton, in the county of Montgomery and State of Ohio, have invented certain new and useful Improvements in Multiple Cash-Registers, of which I declare the following to be a full, clear, and exact description.

This invention relates to the type of cash register known as "key operated," and among the objects of the invention are to provide a multiple totalizer register of that type, wherein a plurality of totalizers have their like denominational elements grouped conveniently to the totalizer actuators of different denominations, the totalizers being mounted to have a collective movement relative to their actuators.

Another object of the invention is to provide differential mechanism positively actuated forward and backward by the keys and adapted to effect transfers by being given extra units of movement, under the control of the totalizer mechanisms.

Another object of the invention is to provide a key operated machine with indicators, wherein the keys differentially actuate the indicators, moving the same directly from one setting to another, without first returning the indicators to some normal position.

Another object of the invention is to provide a plurality of totalizers mounted in a single frame, with special keys for operatively connecting certain of said totalizers with the actuating mechanism, together with value keys also having connections for selecting a certain one of the totalizers for operation provided a special key is not depressed.

Another object of the invention is to provide, in a key operated machine, a totalizer construction and totalizer resetting mechanism well adapted by simplicity of construction and easy operation to effect total printing in such machines.

Another object of the invention is to provide an indicator setting mechanism adapted to move the indicators from one setting directly to another by the simultaneous application of invariable and differential movements to the setting mechanism, the combined movements determining the extent of movement of the indicators, together with means for eliminating the differential movement and thus permitting the invariable movement to restore the indicators to zero.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 10:
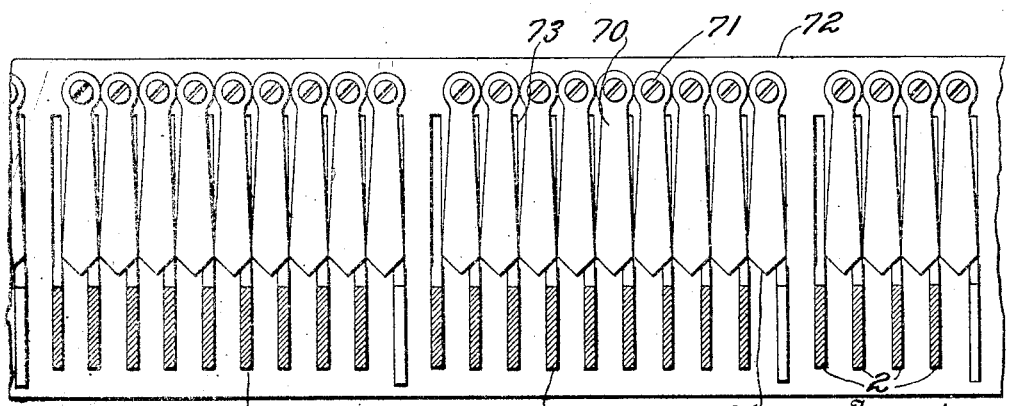
Figure 12:
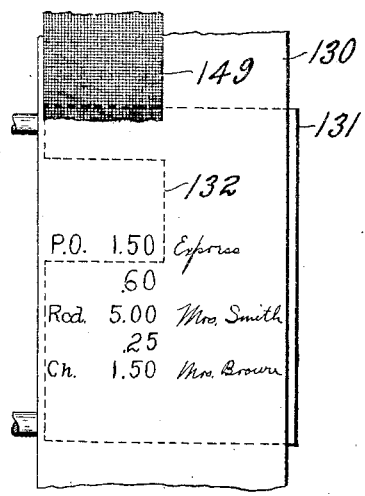
Figure 11:
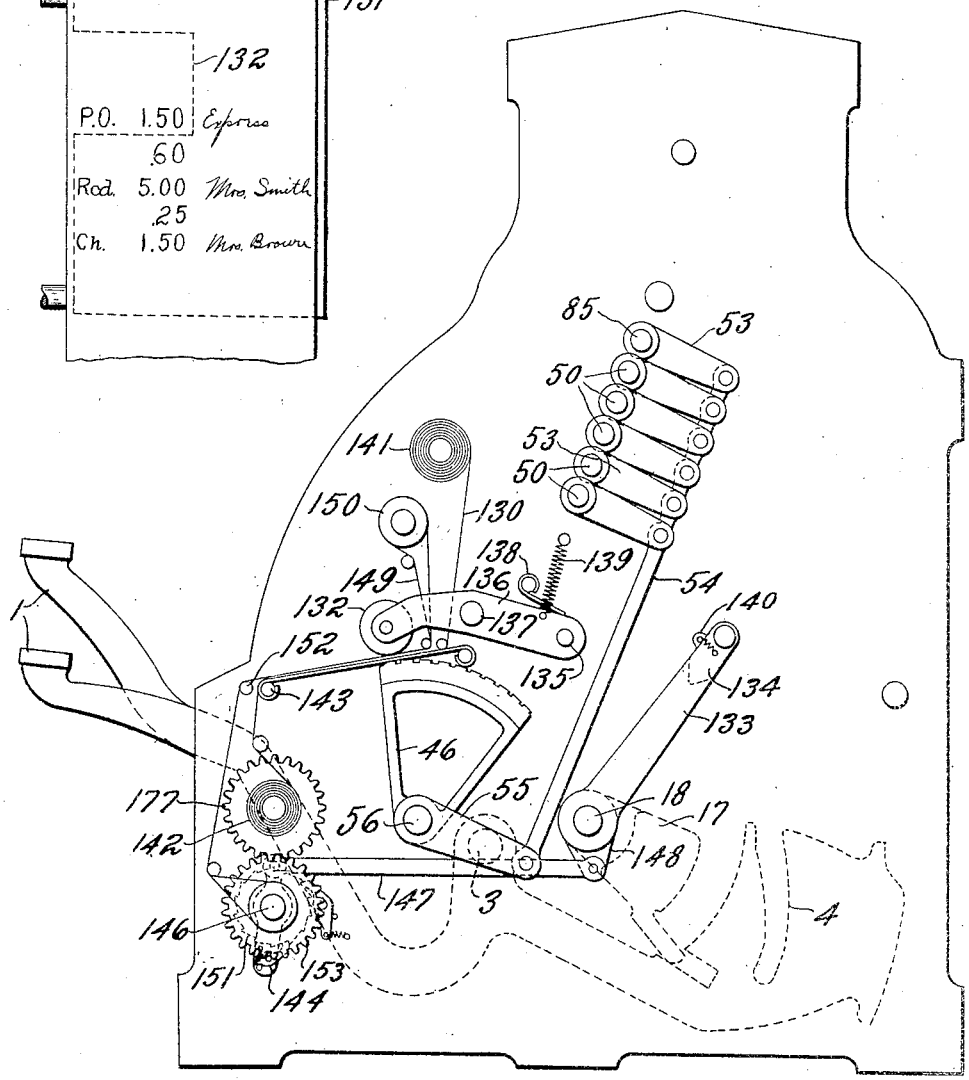
Figure 13:
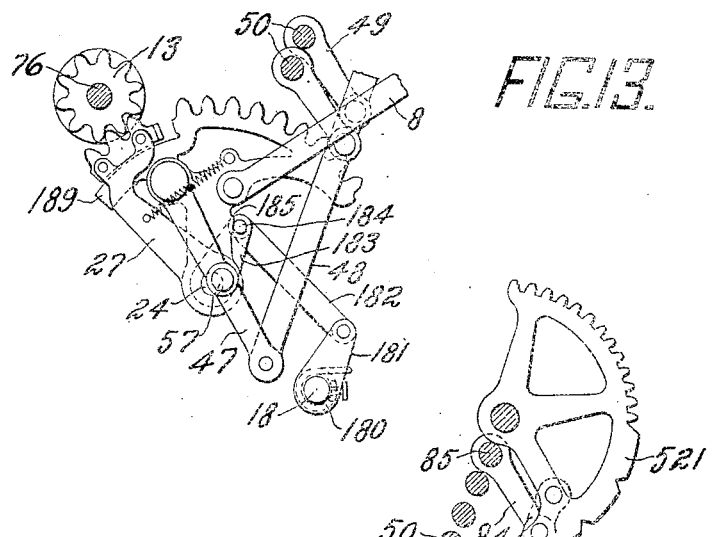
Figure 14:
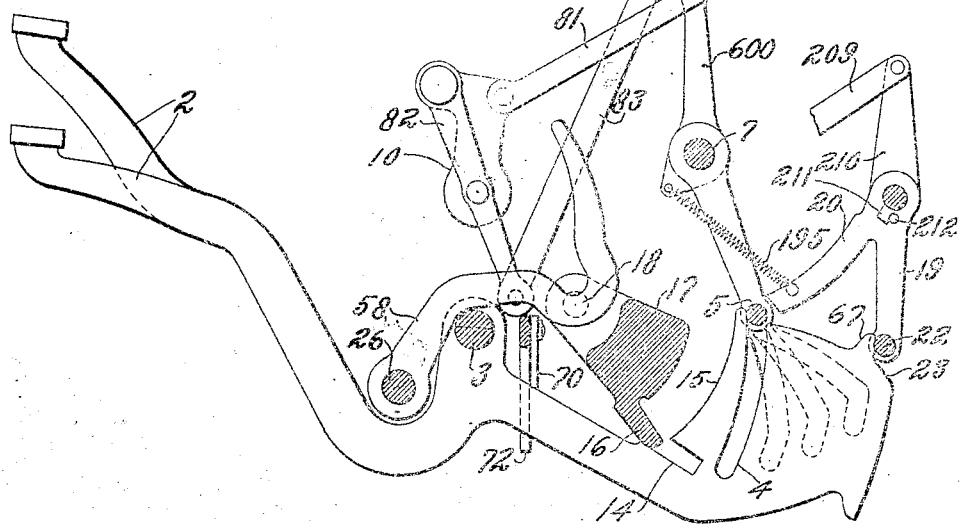

Figure 1 is a transverse vertical section of a cash register constructed according to the invention. Fig. 2 is a transverse vertical section of the totalizer mechanism. Fig. 3 is a detail in transverse vertical section of the differential mechanism and the totalizer mechanism actuated thereby. Fig. 4 is an enlarged right side elevation of one of the value keys and mechanism operated thereby, showing a zero stop for the differential mechanism, the key coupler, and an indicator and type setting cam operated by the key coupler. Fig. 5 is a fragmentary top plan view of the totalizer mechanism and part of the totalizer selecting and actuating mechanisms. Fig. 5ᴬ is a detail of an alining device for the totalizer. Fig. 6 is a detail in left side elevation showing the totalizer mechanism, and devices for rocking the totalizers into and out of mesh with their actuating segments as controlled by the keys, and a totalizer resetting lever. This view also shows part of a mechanism by which any totalizer may be selected for operation. Fig. 7 is a detail in left side elevation of the totalizer resetting lever, and mechanism for controlling the operation thereof. Fig. 8 is a rear elevation of certain rocking frames, which receive differential movement from the keys and transmit it to the totalizer actuating and selecting mechanism, and to the indicator and type setting mechanism. Fig. 9 is a detail in right side elevation of the totalizer resetting lever, showing connections to drive the key coupler, and to actuate the zero stops for the differential mechanism, to permit movement of the differential mechanism when the resetting lever is operated. This view also shows connections from the resetting lever to the key stops, whereby the depression of keys is prevented during resetting operations. Fig. 10 is a sectional view taken on the line 10—10 of Fig. 9 showing the key stops. Fig. 11 is a right side elevation of the machine showing the printing mechanism. Fig. 12 is a top plan view of part of the detail strip and the writing platform over which it passes. Fig. 13 shows in side elevation resilient driving connections, employed in resetting operations. Fig. 14 is a detail in side elevation showing connections whereby the transaction keys control part of the differential mechanism.

The manipulative devices by which the machine is operated are shown as a plurality of banks of value keys, one bank of special transaction keys, and a totalizer resetting lever. All of the necessary power for operating the machine is supplied by one or another of these devices. All of the keys are adapted to oscillate uniformly a key coupler having connections for transmitting power to the totalizer selecting mechanism, the totalizer meshing mechanism, an indicator setting mechanism, and a printing mechanism.

The keys of each bank of value keys are provided at their rear ends with differently inclined slots in position to engage and rock differentially one of a set of pivoted frames having connections to the totalizer actuating segments. The actuating segments are therefore differentially rocked by the keys, but no totalizer is in engagement with the segments during their forward movement.

Certain zero stops are normally in the paths of movement of the segment frames, serving to prevent movements thereof when no key in the corresponding bank is depressed, and the keys are provided with camming surfaces for rocking the stops out of the paths of the segment frames. The segments also serve for controlling the setting of the indicators and the type segments and for this purpose beams, having rollers at their centers, are pivotally connected at one of their ends to the segments and at their other ends to links connecting them to the indicator and the type setting mechanism. Thus the segments endeavor to rock the beams differentially around their pivotal connections with the links, tending correspondingly to displace the rollers from the positions in which they were left on the last previous operation of the machine, but cams driven by the key coupler and having V shaped openings, at this time approach the rollers, holding them in normal position or returning them to normal position regardless of the movement of the segments. The result of the combined movement or the combined action of the segments and cams is that the beams are caused to assume certain angular settings with the rollers as pivotal centers, depending upon the movement of the segments and regardless of the former positions of the beams. The indicators and type carriers are thus set directly from one position to another, the indicators being driven by segment gears to which the aforesaid links are connected and the type carriers are also so connected to the links as to be differentially rocked by the movements of the links.

At the moment the keys reach their fully depressed positions the indicator and type setting mechanism is locked in adjusted position and is not disturbed during the return of the keys. The return movements of the key coupler and the keys cause the V shaped cams to be withdrawn from the rollers on the beams, and the segments to be returned to normal position, the cam slots in the keys serving to perform the latter function. During the return movement, the beams idly rock around their pivotal connection with the links, and consequently the rollers are again moved out of normal position, but on the next operation of the machine, if the beams are not rocked by adjustment of their respective segments, the V shaped cams serve to return the rollers and consequently the indicators and type carriers to zero positions.

A totalizer is held in mesh with the segments during their return movements and consequently the amount of the transaction entered is added to the totalizer.

A novel transfer mechanism is provided in that the segments, in order to effect transfers, have two sets of rack teeth, in alinement, and urged together by a spring so as to be contiguous and to form ordinarily a single rack. In returning, the segments are driven one step past their true zero positions but certain transfer pawls, under control of the totalizer, stop the one of the sets of racks with which they mesh at such times, at the true zero position, except when transfers are to be effected, when the transfer pawls permit an extra movement, in order to cause the necessary additional unit of movement of the totalizer.

The totalizers are journaled on a single shaft, carried by a pivoted frame which may be adjusted in the direction of length of the shaft, so that any desired totalizer may be positioned adjacent the actuating segments. The totalizer frame also may be rocked on its pivot in order to mesh and unmesh the totalizers with the actuating segments. In order to economize space and the necessary adjustment of the totalizer frame the pinions of corresponding denomination are grouped, and the totalizer actuators are located in proximity to their respective groups of pinions. Each totalizer therefore includes one pinion in each group.

The totalizers are so arranged that when value keys alone are depressed, the "Cash" totalizer will be actuated. The transaction keys serve for positioning any one of the remaining totalizers such as "Received on account", "Charge", or "Paid out". The selection is accomplished by providing the transaction keys with cam slots for engaging a pivoted frame connected to a pivoted arm to which is also pivoted one of the aforementioned beams, having connections for setting a transaction indicator and type carrier. A differential shaft, by which motion is transmitted from the beam to the indicator and type carrier, has rigidly secured thereto a segment gear by which differential rotation of the shaft is communicated to the totalizer carrying frame, causing the desired differential movement of the frame, so that the desired totalizer is brought into operative relation with the actuating segments.

The totalizers are rocked into and out of engagement with the actuating mechanism by a camming arm rigidly secured to the key coupler and having proper connections for this purpose. The totalizer rocking mechanism is so constructed as to rock the totalizers out of mesh before the forward movement of the totalizer actuators, and before the sidewise selecting movement of the totalizer carrying frame, and to rock the totalizers into mesh while the totalizer actuators are at rest in their moved positions, and to hold them in mesh during the return stroke of the actuators.

In order to reset any one of the totalizers and to print the total accumulated thereon, it is necessary to give the machine an extra operation before resetting, by the depression of one of the special transaction keys, for the purpose of restoring any transfer mechanism which may have been left in its tripped position on the last previous operation of the machine. At resetting operations, the totalizer which is to be reset is held in mesh with the totalizer actuating segments during their forward movement, but it is at this time, at regular operations of the machine, that the transfer mechanism is restored to normal position. If the transfer mechanism were not in its normal position on a resetting operation, an incorrect total would be printed, as will appear further on in the detailed description of the invention. To compel such an extra operation the indicator mechanism is provided with connections which prevent movement of the resetting lever, unless the indicator mechanism is in zero position, as would be the case after such extra operation. This extra operation of the machine also serves to select the desired totalizer. At regular operations of the machine, when transactions are entered, the totalizer selecting mechanism operates to position the cash totalizer for actuation if no special key is depressed. In order that this same positioning of the cash totalizer will not occur when the resetting lever is operated the resetting lever has connections for maintaining the totalizer carrying frame in the position to which it was brought by the extra operation of the machine.

Depression of any of the keys is prevented when the resetting lever is operated, so as to prevent interference with movement of the totalizer actuating segments at resetting operations, at which time the differential movement of the totalizer actuating segments is determined by the selected totalizer, pins on the totalizer serving to prevent further rotation thereof after it reaches its zero position, and thereby to prevent further rotation of the actuating segments. The differential movement of the segments is communicated to the type carriers and indicators in the same manner as on regular operations of the machine, and thus the total is both printed and indicated. The totalizer actuating segments are driven by springs compressed by the operation of the resetting lever.

*Keyboard.*—All of the value keys 1 and the set of transaction keys 2 are journaled on a rod 3 (Figs. 1, 4 and 14) and are depressible uniform distances. For the purpose of differentially actuating the accounting devices, the keys of each bank have differently disposed slots 4 for engaging rods 5 of frames 6 loosely journaled on a shaft 7. Depression of any value key serves differentially to rock one of the frames 6. The frames are connected by links 8 (Figs. 1 and 3) to segments 9. The segments 9 are provided with two sets of rack teeth 11 and 12 for operating the totalizer pinions 13. A frame 600, actuated by the transaction keys, is connected to an arm 10 concentric with segments 9 but having no teeth, as this arm is not employed for actuating the totalizers. All of the keys are provided with slots 14 and curved surfaces 15 co-acting with a flange 16 on a key coupler 17, loosely journaled on a shaft 18, and, when keys are depressed, serving to couple the keys together and to lock the remaining keys from depression in a well known manner. The keys also co-act with zero stops 19 having projecting arms 20 normally in the paths of movement of the rods 5, to prevent movement of any of the frames 6 when no key in the corresponding bank has been depressed. Each zero stop 19 consists of two arms loosely journaled on a shaft 21 and carrying at their lower ends a rod 22 extending across inclined surfaces 23 of the keys of their respective banks and resting against shoulders 67 on the keys. When a key is depressed the inclined surface 23 engages rod 22 rocking the zero stop rearwardly, in opposition to a returning spring 195, and thereby permitting movement of a frame 6. The depression of more than one key in a bank is prevented by a well known arrangement of key arresters 70 (Fig. 10), there being a plurality of arresters pivotally mounted side by side on pins 71 supported by a frame 72, which is provided with guiding slots 73 to compel vertical movements of the keys. The keys extend between the points 74 of the key stops so that their sidewise movement is limited, and there is just enough free play allowed between all of the key stops of a bank to permit the passage of one key at a time.

*Differential mechanism.*—The segments are each pivoted by a pin 24 to a rigid individual frame 25 supported by the rod 3 and by a shaft 26. The rack 12 of each segment is carried by an arm 27 also pivoted on pin 24 and connected to the main part of the segment by a spring 28, thus permitting relative movement between the parts 11 and 12 of the segment to effect transfer or carrying operations. In operation the part 11 of each segment has a one step free movement before engaging the part 12, the slots in the keys being suitably formed to give the segment such free movement and then to cause the same to be moved forwardly distances corresponding to the values of the keys. The totalizers are not in mesh with them when the segments are at rest in their moved positions, and are rotated by the restoring movements of the segments. The racks 12 are normally stopped in the positions in which they are shown in the drawings by arms 29 of transfer devices comprising the arms 29 and pawls 30 yoked in pairs, and more fully described hereinafter.

To transmit the differential movement of the keys to the indicators 45 and type carriers 46 (Fig. 11), each segment 9 has pivoted thereto a beam 47 connected by a link 48 to an arm 49 fast to the shaft 50. The arms 49 are connected by short links 51 to indicator actuating segments 52, and the shafts 50 carry another set of arms 53, (Fig. 11) connected by links 54 to arms 55 rigid with the type carriers 46, and extending rearwardly from a shaft 56 forming the pivot of the type carriers. Each beam 47 is provided with a roller 57 co-acting with one of a group of V shaped cams 58 fast to the oscillating shaft 26. The shaft 26 has secured thereto a camming arm 60 (Fig. 4) having a cam slot or groove 61, through which extends a roller 62 carried by an arm 63 fast to the key coupler 17. This indicator and type carrier construction is very similar in its mode of operation to that shown in a prior application filed by C. F. Kettering and W. A. Chryst on Sept. 2, 1908, Serial No. 451,446, and it will be readily seen that when the keys are depressed and the coupler rocked upwardly, the cams 58 will engage the rollers 57 and rock the indicators and type carriers, directly from the positions to which they were previously set to their new positions, without returning them to a normal zero position, and that if, in any particular bank, no key is operated, the corresponding type carrier and indicator will be reset to normal or zero position. In the present case a saving of time is accomplished as the cams 58 and segments 9 set simultaneously while in the construction shown in the prior application the corresponding elements acted at different times. The indicators and the type carriers are then locked in their set positions by alining pawls 65 secured to a shaft 66 the manner of oscillating which will be described further on. The alining pawls are held in engagement during the return movement of segments 9, and the cams 58 are returned to normal position by the return movement of the key coupler.

The restoring of the segments 9 occurs through the reverse action of the slots 4 in the keys when they return to normal position by action of the weight of the key coupler but the slots in the keys only serve to return the segments to zero position while their home position is one step past the zero position, for the purpose of permitting carrying operations as before explained. For the above reason mechanism is provided for driving the segments this extra unit of movement. This mechanism includes a frame (Fig. 3) comprising two arms 186 and a rod 188, pivoted on two of the pins 24. The rod 188 extends across the path of shoulders 189 on segments 9, and arms 186 have rearward extensions 190 to which are pivoted links 191 connecting the arms with ears 192 on the key coupler. Rocking of the key coupler causes the rod 188 to move downwardly in advance of the segments 9, and to follow the segments on their return until they reach zero positions, when rod 188 engages shoulders 189 forcing the segments an additional unit past zero.

*Totalizers.*—Each totalizer consists of a plurality of pinions 13 (Fig. 5) which may be provided with the usual numbered drums 75 and transfer pins 32. The pawls 30 have noses 31 co-acting with the trip pins 32 on the transfer totalizer pinions of next lower order to the segments which are respectively stopped by the arms 29. When a totalizer pinion passes from "nine" to "zero" position its pin 32 engages the nose 31, rocking both of the arms 30 and 29 downwardly, thus carrying a flange 33 of the arm 29 out of the path of movement of a flange 34 on the rack 12, thereby permitting the rack 12 to move rearwardly one step as driven by spring 28 and while in engagement with rack 11, thus rotating the higher order pinion the desired extra unit.

When a transfer device is tripped by its trip pin 32 it is held in its tripped position by a spring actuated pawl 35 (Fig. 2) having two notches 36 and 37 co-acting with a pin 38 on the arm 30. The holding pawl 35 and the trip arm 30 are united by a spring 39 which normally holds the arm 30 so that its pin 38 is in the notch 36, but when the arm 30 is rocked downwardly by engagement with a trip pin 32, the pin 38 is carried out of the notch 36, permitting pawl 35 to rock forwardly and to come to rest with the pin 38 in notch 37, which is farther away from the pivot 40 of pawl 35 and therefore serves to hold the pawl in its tripped lower position.

At the beginning of each operation of the machine any of the transfer devices which are in their tripped position are permitted to return to normal position by rocking the pawls 35 rearwardly so that their notches 36 come above pins 38. To accomplish this the totalizer frame 41, pivoted on a rod 42, is provided with a cross bar 43 for engaging arms 44 of the holding pawls 35 and the totalizer frame is rocked upwardly around its pivot 42, as hereinafter described, at the beginning of each operation of the machine, thus engaging arms 44 and restoring the pawls 35. No means are provided for carrying from or rather recording complete rotations of the pinions of highest order as it is intended that the totalizers be reset and printed records of totals made before the totalizers are rotated to their full capacity. In resetting operations pawls 30 serve as zero stops for the totalizer pinions and in the case of the highest order pinions a bent extension 113 of pawls 29 (Fig. 5) serves this purpose.

All of the totalizer pinions are journaled on a shaft 76 carried by a frame 41 loosely journaled on the shaft 42 but prevented from sidewise movement relatively of the shaft by collars 77 and 78. The shaft 42 is supported by hanger bearings 79 secured to side frames 80 of the machine and may be shifted axially or in the direction of its length, for the purpose of bringing any desired set of totalizer pinions 13 into the planes of movement of segments 9. In order that a slight shifting only of this shaft is necessary to position any totalizer opposite the actuators 9, the corresponding pinions of the several totalizers are grouped by denominations, thus one totalizer may include the first pinion of each group, and another totalizer, the second pinion of each group, etc. In the drawings four totalizers are shown and accordingly there are four pinions to each group as shown between each pair of segments 9 (Fig. 5). The normal position of the totalizers is with the "cash" totalizer opposite the segments 9 and in order operatively to position one of the other transaction totalizers, one of the special keys 2 (Fig. 14) is depressed, simultaneously with the desired value keys representing the amount of a transaction. The special keys 2 serve to rock differentially a frame 600 as the value keys differentially rock the frames 6, and frame 600 is connected by a link 81 to the arm 10 (Fig. 14), a beam 82 connected to this arm and corresponding to the beams 47, being connected by a link 83 to an arm 84 fast on a shaft 85 above the shafts 50. This shaft is connected to a transaction indicator and to a transaction type carrier, about as the shafts 50 are connected to the value indicators and type carriers. In addition it carries a segment beveled gear 86 (Figs. 5 and 6) meshing with a beveled pinions 87 fast to a short shaft 88, which is mounted in a bracket 89 extending from the frame of the machine, and also having rigidly secured thereon a pinion 90 meshing with a rack 91 fast to the totalizer frame shaft 42. Consequently differential rocking of shaft 85 under the action of arm 10, and the respective cam 58 for that arm, causes longitudinal movement of the shaft 42 and the totalizer carrying frame 41. By this means the desired totalizer is brought opposite the segments 9. The longitudinal shifting of the totalizers occurs while the segments 9 and arm 10 are moving forwardly, at which time the totalizers are out of mesh with segments 9.

When the totalizers and shaft 42 are moved longitudinally the transfer devices are prevented from similar movement by collars 126, one of which is shown in Fig. 5, supported by brackets 79.

The meshing and unmeshing of a selected totalizer is accomplished by a rocking movement of frame 41 around the shaft 42 by mechanism shown in Fig. 6. This mechanism is constructed to rock the totalizers out of mesh at the beginning of each operation of the machine, holding them out of mesh until the segments 9 and arm 10 are at rest in their moved positions and then meshing the selected totalizer, and holding the same in mesh for the remainder of the operation of the machine. To this end, the key coupler has secured thereto an arm 92, carrying a cam plate 93 co-acting with a roller 94 on a lever 95, journaled on shaft 42 and having shoulders 96 and 97 for respectively engaging pins 98 and 99 on a spider 100 comprising arms 101, 102, 103 and 104, the arms 101 and 102 being connected by a circular spring carrying bar 102¹. The arm 103 is forked at its outer end over a pin 105, carried by an arm 106 loosely journaled on the totalizer shaft 76 but prevented from lateral movement therewith, by brackets 107 secured to the side frame 80 (Fig. 5). The pin 105 also extends through a slot 108 (Fig. 6) in a lever 109, pivoted on a fixed pin 110 and normally prevented from movement by an arm 111 fast to the shaft 18, and provided with a slot 112 through which a pin 113 on the arm 109 extends. When the key coupler is rocked upwardly, the inclined surface 114 of the plate 93 engages roller 94, rocking the arm 95 downwardly and engaging its shoulder 96 with pin 98, thus rocking the plate 100 so that its rearwardly extending arm 103 is carried upwardly, thereby, through the pin 105 and arm 106, rocking the totalizer frame 41 upwardly and the totalizers out of meshing position. The slot 108 in the arm 109 serves to guide pin 105 and prevent it from being disengaged from the forked arm 103 while the totalizer is being rocked out of mesh, and when it is again rocked into mesh while the segments 9 and arm 10 are at rest in their moved positions. At the beginning of the return movement of the key coupler cam surface 116 engages roller 94 rocking arm 95 upwardly, thereby causing shoulder 97 to engage pin 99, and thus rocking the plate 100 so that the totalizer is again meshed with the segments 9. During the return of the key coupler the totalizer is held in mesh by the upper surface 117 of plate 93 which serves to hold the arm 95 in its moved position.

At each rocking movement of arm 95, whether up or down, one or the other of two springs 118 and 119 which surround bar 1021 are compressed between the arm 95 and arms 102 and 101 of spider 100 so that when the roller 94 comes to the ends of the plate 93 the arm will be rocked by one of the springs so that the roller 94 may be engaged by one or the other of the inclined edges 114 or 116 of the plate 93. The rocking movement of plate 100 is also employed to engage and disengage the alining devices 65 (Fig. 1) with alining teeth 120 of the indicator segments 52. For this purpose the arm 104 of the spider 100 is connected by a link 121 to an arm 122 fast to shaft 66. Accordingly when the totalizer is rocked out of mesh the alining pawls 65 are rocked out of engagement permitting rotation of segments 52, and when the totalizer is rocked into mesh, the alining pawls are engaged with the segments 52 preventing further movement of the same.

Rotation of the totalizer pinions is prevented when they are out of mesh with the segments 9, by spring pressed pawls 1210 (Fig. 2) pivoted on a rod 1220 carried by the totalizer frame and having upwardly extending arms 123 provided with rollers 124 co-acting with a fixed bar 125. When the totalizer frame 41 is rocked upwardly around the pivot 42, the rollers 124, by engagement with fixed bars 125 and the upward movement of rod 1220, compel the pawls 1210 to rock downwardly meeting the totalizer pinions as the same are moved upwardly and preventing rotation of the same. When the totalizers are shifted longitudinally the pawls 1210 are carried therewith, the rollers 124 relieving friction between the pawls and the bar 125.

*Indicators.*—The indicators comprise the usual numbered drums 45 (Fig. 1) rigid with pinions 127 meshing with the setting segments 52 and all of the drums and pinions are loosely journaled on a rod 128.

*Printing mechanism.*—The printing mechanism (Fig. 11) is adapted to print the amounts and classes of transactions on a detail strip 130, passing over a writing platform 131 and between a platen 132 and the type carriers 46. The writing platform 131 (Fig. 12) is suitably cut-away at 132 to permit the platen to force the detail paper against the type carriers 46 which are located below the left hand side of the writing platform 131. In order to operate the platen 132 the key coupler 17 has rigidly secured thereto an arm 133 having a wiper pawl 134 for engagement with a roller 135 on the rear end of a platen carrying arm 136 which is pivoted to the side frame of the machine by a pin 137 and is normally held a slight distance above the detail paper by a spring 138. When arm 133 rocks forwardly the pawl 134 engages roller 135 rocking the platen 132 upwardly around the pivot 137 and thereby tensioning spring 139. When pawl 134, which is prevented from rocking at this time by a pin 140, passes forwardly of roller 135 the spring 139 forces the platen into engagement, thereby effecting the impression, spring 138 at this time giving slightly but serving to prevent vibration of the platen against the type carriers. On the return of arm 133 pawl 134 idly rocks upward, when passing pin 135, not affecting the position of the platen. The detail paper 130 is guided from a supply roll 141 over the writing platform and to a receiving roll 142 by rollers 143, and an endless ink ribbon 149 passes over the detail strip being guided by rollers 150, 151 and 152. The receiving roll 142 and the ink ribbon roller 151 are rotated properly to feed the paper and ink ribbon by a pawl 144 carried by an arm 145, pivoted on a shaft 146 and having a link connection 147 to an arm 148 rigid with the key coupler 17. Shaft 146 supports the roller 151 to which is fastened a ratchet 176 co-acting with pawl 144. A gear 153 rigid with roller 151 meshes with a gear 177 fast to the receiving roller 142 and thereby serves to rotate roller 142.

*Resetting and total printing.*—Resetting is accomplished by backward rotation of the totalizer pinions to their normal positions while in mesh with segments 9, and the differential movement of the segments is communicated to the indicators and type carriers through the beams 47, in the same manner as when a transaction is entered in the machine.

In order backwardly to rotate the totalizer pinions and at the same time differentially actuate segments 9 according to the extents of backward rotation of the pinions, it is necessary to have the desired totalizer in mesh with the segments during their forward movement, and to regulate the forward movements of the segments by the totalizer. Accordingly it is necessary to prevent the depression of any value keys at resetting operations, and also to have all of the transfer devices restored to normal position to insure the correct indicating and printing of the total, as in total printing operations the transfer devices serve as stops when the totalizer pinions are reversely restored. By operating the machine by depressing a transaction key but none of the value keys, the restoring of the transfer devices is insured. To this end, means are provided for preventing operation of the resetting lever until the indicators, differential mechanism, etc., are restored to zero position as would occur by so operating the machine. Also by the depression of one of the transaction keys the totalizer, which it is desired to reset, is brought into operative relation with the segments 9 and the resetting lever is provided with means for preventing the shifting of the totalizer when it is operated. By the depression of a transaction key the totalizer is selected, as previously described, and in order that the resetting lever may prevent a second shifting, it is provided with connections for readjusting the segment 10 after it is restored to normal position by the return of the transaction key.

To compel the restoring of the transfer devices, the resetting lever 154 is fast to shaft 18 which rigidly carries an arm 155 (Fig. 7) connected by a link 156 to an arm 157 fast to a shaft 158, which also carries fast thereon a number of arms 159 having curved surfaces 160, and located at the sides of the segment gears 52 which actuate the value indicators. The segment gears 52 carry pins 161 which, when the gears are in zero position, are below the surfaces 160 of arms 159, and therefore permit rocking movement of arms 159 and the operation of the resetting lever. If any one of the segment gears 52 is not in its zero position, its respective pin 161 will be in the path of movement of one of the arms 159, thereby preventing operation of the resetting lever. The extra operation before referred to is thereby made necessary in order to operate the resetting lever.

For reversely rotating the selected totalizer to zero position the resetting lever shaft 18 has fastened thereto, at one of their ends, (Fig. 13) a plurality of springs 180, coiled around the shaft and fastened at their other ends to arms 181 loosely journaled on shaft 18. The arms 181 are connected by links 182 to arms 183 loosely journaled on the pins 24, and rollers 184 are journaled on the pivots connecting arms 183 to links 182. The rollers 184 co-act with shoulders 185 on the segments 9 and 10 to force the segments forward when the resetting lever is operated. The totalizer pinions are thus rotated backwardly to zero position and are prevented from rotating past such position by the pins 32 engaging the radial sides of the noses 31 on the transfer trip pawls 30. The springs 180 permit the complete oscillation of shaft 18 regardless of the differing positions in which the various segments 9 may be stopped by the pins 32. The differential movement of segments 9 and the operation of cams 58, adjust the beams 47 and consequently the indicators and type carriers, in the same manner as previously described but according to the amount accumulated by the totalizer.

In order to operate cams 58, the alining devices 65 (Fig. 1), and the platen 132 (Fig. 11), it is necessary to oscillate the key coupler as usual. The value keys operate the key coupler when transactions are entered, but they are not depressed on resetting operations, and therefore shaft 18 is provided with an arm 174 (Fig. 9) fixed thereto, and extending below a pin 175 on the key coupler and thus lifts the key coupler when the resetting lever is operated. The operating segments 9 are restored to normal position after a totalizer is reset, precisely in the manner of restoration at an operation at which an item is entered in a totalizer, and as previously described, by the frame 186 (Fig. 3), actuated by the key coupler 17, through the link connection 191.

As the selected totalizer should be held in mesh during the forward movement of the totalizer actuating segments, it is necessary to make the regular totalizer meshing mechanism ineffective, and to provide means for unmeshing the totalizer when the segments are at rest in their moved positions. For this purpose the arm 111 is fast to the resetting shaft 18 to be oscillated thereby. Forward movement of arm 111, by slot 112 engaging roller 113, rocks lever 109 so that roller 113 rests on the circular edge 197 of arm 111, and roller 108 is carried downwardly into a jaw 198 of a lever 199, pivoted by a pin 200 to the machine frame and carrying a wiper pawl 201, for co-acting with an extension 202 of arm 111. The end 203 of extension 202 first engages a pin 204 on pawl 201, idly rocking the pawl on its pivot in opposition to a spring 205, but on the return movement of arm 111 the shoulder 206 engages the pin 204 in the opposite direction and the pawl is prevented from rocking by a pin 207 on lever 199. Thus the lever 199 is rocked upward, and through the pin 105 and arm 106 rocks the totalizer out of mesh. The curved extension 202 serves to hold the totalizer out of mesh during the return of arm 111 at which time the totalizer actuating segments are returned to normal position. When extension 202 is clear of pin 204, the totalizer rocks downward by gravity into mesh with the actuating segments and slot 112 returns roller 113 into normal position in the slot thereby rocking lever 109 and through it rocking arm 106 into normal relation with the totalizer meshing mechanism.

On resetting operations it is necessary to have all of the zero stops 20 (Fig. 1) out of the paths of rods 5 in order to permit movement of the totalizer actuating segments 9. To accomplish this object by operation of the resetting lever, shaft 18 carries rigidly an arm 208 (Fig. 9) connected by a link 209 with an arm 210 fast to shaft 21 on which are loosely journaled the stops 20. Shaft 21 carries a number of pins 211 for engaging pins 212 extending from the sides of stops 20 and consequently rocking of shaft 21 by movement of the resetting lever, causes pins 211 to engage pins 212 and rock the stops 20 away from rods 5.

It was previously explained how, when transactions are entered and no transaction key is depressed, the totalizers are automatically set so that the amount entered will be added to the "Cash" totalizer. This shifting mechanism becomes ineffective when zero stop 20, (Fig. 14) co-acting with rod 5 of frame 600, is moved by the resetting lever. The frame 600 being free to rock, action of cam 58 on beam 82 results in the beam idly rocking around its pivotal connection with link 83. Further positively to prevent shifting of the totalizer frame on resetting operations, a locking pawl 220 (Fig. 5A) is provided for engaging notches 221 in the totalizer shaft 76 when the totalizer is in its lower or meshing position.

The arm 174 (Fig. 9) fast to the resetting shaft 18 is pivoted to the link 215 connecting it with one of the arms 216 of which there are as many rigid with shaft 3 as there are banks of keys, these being adapted to co-act with the key stops of their respective banks and prevent depression of any keys when the shaft 3 is rocked through the connection of one of these arms 216 with resetting lever 154, this rocking of the shaft carrying all the arms 216 into coöperation with the key stop. Thus operation of any of the keys is prevented and accordingly it is impossible to interfere with the operation of the machine when a totalizer is reset, by the depression of one of the keys.

*Operation.*—To enter a cash transaction it is simply necessary to depress value keys representing its amount. If the transaction is other than cash a transaction key representing its class must be depressed simultaneously with the value keys. Depression of the keys rocks the key coupler 17 upwardly, and the mechanism operated thereby first rocks the totalizer carrying frame 41 upwardly out of mesh by plate 93 (Fig. 6), fast by arm 92 to the coupler, engaging roller 94 thus rocking arm 95 into engagement with pin 98 on plate 100. Movement of plate 100 through pin 105 and arm 106 rocks the totalizer frame 41 upward. The inclined edges 23 (Fig. 1) of depressed keys engage the rods 22 for their respective banks, rocking the zero stops 20 away from the rods 5, permitting movement of the segments 9 as driven by the slots 4 engaging the rods 5. At the same time the roller 62 on arm 63 fast to the key coupler, engages the slotted arm 60 fast to the shaft 26, thereby rocking the V shaped cams 58 into engagement with the rollers 57 on the beams 47 rocking the beams 47 around their pivotal connection with the segments, thus bringing the rollers to a central position, if not in such position, and thereby positioning the indicators and type carriers. Such of the segments 9 as are not moved by action of the keys cause their respective beams 47 to rotate the indicators and type carriers back to zero position. A depressed transaction key 2 will likewise control its respective indicator and type carrier and the shaft 85, which is differentially rocked by the transaction arm 10 (Fig. 14), by its segment gear 86 (Fig. 6), rotates the shaft 88, thus, through the pinion 90 and rack 91, shifting the totalizer carrying frame to position the desired transaction totalizer opposite the totalizer actuating segments. If no transaction key is depressed the cash totalizer either remains in operative position or is brought thereto by the respective cam 58 (Fig. 14) adjusting beam 82 to zero position. After adjustment of the type carriers the pawl 134 (Fig. 11) passes over pin 135 permitting the platen to spring downwardly and effect the impression of the amount and class of the transaction. Before the keys are permitted to return to normal position, the totalizer is first meshed by end 116 of plate 117 (Fig. 6) engaging roller 94, thus rocking plate 100 and through the pin 105, the totalizer frame, and then slots 4 in the keys return the totalizer actuators 9 to normal position, thus differentially rotating the totalizers as desired. If any of the pinions are rotated beyond the "nine" position, the pins 32 engage the pawls 30 thus rocking the arms 29, to which the pawls are sleeved, out of the paths of segments 9 of next higher order, thus permitting them to rotate their respective pinions the required extra unit.

To reset one of the totalizers the machine is operated twice. First, by depressing one of the transaction keys 2, and second, by operating the resetting lever 154. The resetting lever is usually prevented from operation by one or more of the pins 161 on segment gears 52 (Fig. 7) being in the paths of arms 159, as is the case whenever any of the indicators are out of zero position. The only way in which the indicators and the segments 52 may be restored to zero, is by operating one of the transaction keys. Such an operation also serves to position the corresponding totalizer opposite the totalizer actuating segments 9. To position the cash totalizer the "no sale" key of the bank of keys 2 is depressed. The slot in this key (Fig. 14) is not eccentric to the pivot of the key and therefore the corresponding rod 5 is held in zero position. The cam 58 of the transaction bank then serves automatically to position the selected totalizer opposite the segments 9. The operation of the remaining cams 58, as propelled by the key coupler, serves to position all of the value indicators and type carriers at zero, thus bringing all of the pins 161 to the position shown in Fig. 7. The resetting lever 154 may now be operated as the arms 159 mechanically connected to the resetting lever as shown in Fig. 7, may be rocked around their pivots 158.

The key coupler 17 is rocked upward (Fig. 9) by the arm 174 fast to shaft 18 engaging pin 175 and is returned to normal position by gravity. Operation of the key coupler serves to tension all of the springs 180 (Fig. 13) thereby driving the segments 9 different distances as determined by pins 32 on the totalizer pinions 13. When the pinions arrive at zero position by thus being backwardly rotated, the pins 32 engage the radial side of shoulders 31 of the pawls 30. The cams 58 are simultaneously actuated by the upward movement of the key coupler thereby, in combination with the action of segments 9, differentially positioning the indicators to indicate the total which had been accumulated by the reset totalizer, and differentially positioning the type carriers so that this total may be printed. The impression of the total is then taken, as at this time the pawl 134 (Fig. 11), fast to an arm secured to the key coupler, passes clear of the pin 135 on the platen carrying arm 136, thus permitting the spring 139 to drive the platen downwardly into contact with the detail strip and type carriers. At the time the impression is taken, the segments 9 are at rest in their moved positions, and upon the begining of the return movement of the key coupler 17, the shoulders 206 on the cam 111 (Fig. 6) engages the pin 204 on the pawl 201 thereby rocking the arm 199 upwardly around its pivot 200, and through the pin 105 and arm 106 rocking the totalizer out of mesh. The totalizer is held out of mesh, during the return of the key coupler and while the restoring yoke 186 (Fig. 3) is acting on segments 9, by the upper surfaces 202 of cams 111 engaging the pin 204. When the cam 111 reaches its normal position it is clear of the pin 204, thereby permitting the arm 199 to rock downwardly and the totalizer to mesh with the segments 9, they having reached their zero position. At the end of the movement of cam 111 the slot 112 serves to cam the roller 113 downwardly, thereby restoring the lever 109 to normal position, and the pin 105 into the jaw of the arm 103. The machine is then in condition again to be operated either for the purpose of resetting another of the totalizers or for entering a transaction.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow. For example, many other forms of accounting mechanism besides the totalizers, the indicators, or the printing mechanism herein described, may be employed, and it is considered that the use of any device for retaining within the machine entries of transactions in the combinations claimed is within the scope of the invention.

What is claimed is:

1. In a machine of the class described, the combination with a totalizer, of actuating racks therefor, constructed to effect transfers by an additional movement of said racks, a plurality of keys, having means for positively moving said racks different distances and returning them upon return of the keys to normal position, and connections, actuated by said keys, and constructed to engage the totalizer with the actuating racks during one stroke of said racks and to disengage the totalizer from the racks during the other stroke thereof.

2. In a machine of the class described, the combination with an indicator, of a pinion secured thereto, a segment gear meshing with the pinion, a beam, a link connecting the segment gear to one end of the beam, a plurality of keys, connections between said keys and the beam whereby the beam may be differentially rocked around its connection with the link, said beam pivoted at its opposite end to said connections, a roller on the beam midway between its pivot, a cam for engaging said roller constructed to return the roller to normal position after a key has caused the roller to be positioned away from normal position by rocking the beam, and said cam connected to be driven by the keys.

3. In a machine of the class described, the combination with a plurality of totalizers, of actuating mechanism for the totalizers special keys, means, operated by the special keys, for positioning a desired totalizer into operative relation with the actuating mechanism and constructed to position or to retain in operative relation with the actuating mechanism a certain one of said totalizers if the machine is operated and no special key is depressed, a totalizer resetting device, and connections from said resetting device so constructed as when operated to make said totalizer positioning means ineffective.

4. In a machine of the class described, the combination with a plurality of totalizers, of actuating mechanism for the totalizers, special keys, means, operated by the special keys, for positioning a desired totalizer into operative relation with the actuating mechanism, totalizer resetting mechanism, and means controlled by the totalizer resetting mechanism for preventing operation of a special key.

5. In a machine of the class described, the combination with an accounting mechanism, of a plurality of keys for controlling said accounting mechanism, a key coupler, a resetting device for the accounting mechanism, and connections from the resetting device for operating the key coupler.

6. In a machine of the class described, the combination with a totalizer, of actuating racks for the totalizer, a plurality of keys, having connections positively and differentially to reciprocate the racks, a resetting mechanism, springs controlled by the resetting mechanism to force said racks in one direction, and devices, actuated from said resetting mechanism for positively returning the racks to normal position.

7. In a machine of the class described, the combination with a totalizer, of totalizer actuating mechanism, means for moving the totalizer into and out of operative relation with the actuating mechanism, carrying mechanism adapted to effect transfers while the totalizer is in operative relation with the actuating mechanism, means, controlled by the totalizer, for tripping the carrying mechanism, and devices whereby movement of the totalizer out of mesh controls the restoration of the carrying mechanism to normal condition.

8. In a machine of the class described, the combination with a totalizer, of totalizer actuating mechanism, means for moving the totalizer into and out of operative relation with the actuating mechanism, carrying mechanism adapted to effect transfers while the totalizer is in operative relation with the actuating mechanism, means, controlled by the totalizer, for tripping the carrying mechanism, and devices whereby movement of the totalizer restores the carrying mechanism to normal condition.

9. In a machine of the class described, the combination with an accounting mechanism, of an actuating mechanism for the accounting mechanism, a beam pivotally connected at one end to the actuating mechanism, and means for simultaneously engaging the beam at two points to adjust it differentially.

10. In a machine of the class described, the combination with an accounting mechanism, of an actuating mechanism for the accounting mechanism, a beam pivotally connected at one end to the actuating mechanism, means for differentially rocking the beam by engagement at another point along its length, and means for simultaneously differentially rocking the beam by engagement therewith at a third point along its length.

11. In an accounting machine, the combination with a totalizer, of differential mechanism, driving mechanism, totalizer meshing mechanism operated by the driving mechanism, a resetting device, totalizer meshing mechanism operated by the resetting device, and means controlled by the resetting lever for making the meshing mechanism operated by the driving mechanism inoperative.

12. In a machine of the class described, the combination with a totalizer, of totalizer actuating mechanism, means for moving the totalizer into and out of operative relation with the actuating mechanism, carrying mechanism adapted to effect transfers while the totalizer is in operative relation with the actuating mechanism, means, controlled by the totalizer, for tripping the carrying mechanism, and devices for holding the carrying mechanism in its tripped position, arranged whereby movement of the totalizer out of mesh controls the restoration of the carrying mechanism to normal condition.

13. In a machine of the class described, the combination with a totalizer, of actuating racks therefor adapted to effect transfers by an additional movement of said racks, a plurality of keys adapted to positively move the racks different distances and to positively return the racks with the return of the keys to normal position, and means for controlling the connection and disconnection of the totalizer with the actuating racks.

14. In a machine of the class described, the combination with a totalizer, of actuating racks therefor, a plurality of keys having means for positively moving said racks different distances and positively returning the racks with the return of the keys to normal position, and an additional means for positively returning the racks to normal position.

15. In a machine of the class described, the combination of an indicator, a beam for actuating the indicator, operatively connected at one end with it, a plurality of keys, connections between the keys and the other end of the beam whereby the latter may be differentially rocked from the keys around its end which is connected with the indicator, and a cam driven from the keys for engaging the beam intermediate its ends to return the intermediate portion of the beam to normal position in case it has been moved therefrom by the keys.

16. In a machine of the class described, the combination with a plurality of totalizers, of actuating mechanism therefor, special keys, means operated by the special keys for positioning a desired totalizer in operative relationship with the actuating mechanism, a totalizer resetting device and connections from said resetting device whereby its operation prevents an operation of the totalizer positioning means.

17. In a machine of the class described, the combination with a totalizer, of actuating racks therefor, a plurality of keys for controlling the differential movement of the racks, a key coupler, indicating mechanism adjusted thereby in accordance with the adjustment of the racks, and a resetting device adapted to yieldingly drive each rack in one direction to return the totalizer wheels to zero and to actuate the key coupler to adjust the indicating mechanism in accordance with the extent of movement of the actuating racks in returning the totalizer wheels to zero.

18. In a machine of the class described, the combination with a totalizer, of an actuating mechanism therefor, keys for operating the actuating mechanism, indicating mechanism, a beam pivotally connected at one end to the actuating mechanism and at the other with the indicating mechanism, and means also operated from the keys for engaging the beam intermediate its ends to position the indicating mechanism in accordance with the movement of the actuators.

19. In a machine of the class described, the combination with a plurality of keys, of a series of totalizers, totalizer actuating mechanism for the totalizers, and connections whereby the keys selectively directly position the totalizers in operative relationship with the actuating mechanism without their first being moved into any definite position.

20. In a machine of the class described, the combination with a plurality of keys, of a series of totalizers, totalizer actuating mechanism, and connections whereby the keys differentially and positively move the totalizers directly from one position to another to bring any of them into operative relationship with the actuating mechanism.

21. In a machine of the class described, the combination with a plurality of keys, of a series of totalizers, totalizer actuating mechanism, and connections whereby the keys differentially and positively move the totalizers directly and in either direction to bring any of them into operative relationship with the actuating mechanism.

22. In a machine of the class described, the combination with a plurality of keys, of a series of totalizers having their like denominational elements grouped together, a set of actuators, and means whereby the keys differentially shift the totalizers as a unit laterally to position any of them in operative relationship with the set of actuators.

23. In a machine of the class described, the combination with a plurality of keys, of a series of totalizers having their like denominational elements grouped together, a set of actuators, and means whereby the keys move the totalizers as a unit laterally to directly position any of them in operative relationship with the set of actuators without first returning the totalizers to any definite position.

24. In a key operated machine, the combination with a plurality of keys, of a larger number of totalizers, a set of actuators, connections whereby the keys positively move their corresponding totalizer into operative relationship with the actuators, and means whereby when no one of the totalizer keys is depressed a totalizer having no key is positively moved into or retained in operative relationship with the actuators.

25. In a machine of the class described, the combination of a totalizer comprising a plurality of totalizer pinions; a set of actuators therefor; a series of keys adapted differentially to oscillate the actuators and having connections for engaging the totalizer pinions with the actuators during movement in one direction only of the latter; and alternate operating means adapted to mesh the totalizer with the actuators during the movement of the actuators in the other direction whereby to control the positioning of the actuators from the totalizer pinions.

26. In a machine of the class described, the combination of a totalizer; means for operating the same differentially; an indicator to be set by the operating means to indicate the extent of actuation of the totalizer; and a second operating means adapted to render the first operating means inoperable and having connections to set the indicator to indicate an amount standing on the totalizer.

27. In a machine of the class described, the combination of a totalizer; printing mechanism; indicating mechanism; means for differentially operating the totalizer and operating the printing and indicating mechanism accordingly; and means coöperating with the operating means but disabling the control of the totalizer from said differential operating means, for setting the printing mechanism and the indicating mechanism in accordance with the amount standing on the totalizer.

28. In a machine of the class described, the combination of a plurality of totalizers; a common set of actuators therefor with manipulative means for controlling their differential movement; special keys, one less in number than the totalizer, for selecting the totalizer to be operated; connections whereby the additional totalizer is automatically selected if the machine is operated to enter items in the totalizer with no special key depressed; a manipulative means adapted to operate the machine to turn the totalizer pinions to zero; and connections whereby no selection of a totalizer is possible in an operation of the machine by said manipulative means.

29. In a machine of the class described, the combination of a plurality of totalizers; a series of amount keys for differentially operating the totalizers; special keys for selecting the totalizer to be operated; and means for operating the machine to turn the totalizer to zero adapted when operated to prevent operation of both the amount keys and the special keys for selecting the totalizer.

30. In a machine of the class described, the combination with a plurality of keys, of a series of totalizers, a set of actuators common to the totalizers, and connections whereby differential relative movement between the actuators and the totalizers directly from one relative position to another is caused by operation of the keys.

31. In a machine of the class described, the combination with a plurality of totalizers, each to receive entries of a certain class, of a movable frame supporting the totalizers, actuating mechanism, a keyboard comprising entry classifying keys and amount keys, any desired entry classifying key being operable simultaneously with the keys representing the amount of the entry, and mechanism controlled by the keyboard whereby simultaneous operation of a classifying key and amount keys will first move the aforesaid frame to establish operative relationship between the desired totalizer and the actuating mechanism and then enter the amount on said totalizer.

32. In a machine of the class described, the combination with a plurality of totalizers, each to receive entries of a certain class of a movable frame supporting the totalizers, actuating mechanism, a keyboard comprising entry classifying keys and amount keys, any desired entry classifying key being operable simultaneously with the keys representing the amount of the entry, and mechanism controlled by the keyboard whereby simultaneous operation of a classifying key and amount keys will first move the aforesaid frame directly and in either direction from one position to another to establish operative relationship between the desired totalizer and the actuating mechanism and then enter the amount on said totalizer.

In testimony whereof I affix my signature in the presence of two witnesses.

WILLIAM A. CHRYST.

Witnesses:
 ROY C. GLASS,
 CARL W. BEUST.